United States Patent [19]

Lauritsen

[11] Patent Number: 5,186,418
[45] Date of Patent: Feb. 16, 1993

[54] SELF GUIDED RECOVERABLE AIRBORNE INSTRUMENT MODULE

[75] Inventor: Dean K. Lauritsen, Boulder, Colo.

[73] Assignee: University Corporation for Atmospheric Research, Boulder, Colo.

[21] Appl. No.: 738,350

[22] Filed: Jul. 31, 1991

[51] Int. Cl.[5] .............................................. B64D 1/08
[52] U.S. Cl. ................................. 244/138 A; 244/152; 342/64; 102/387
[58] Field of Search ............... 244/138 R, 138 A, 152, 244/32; 102/384, 385, 387, 348, 354; 342/64; 367/4

[56] References Cited

U.S. PATENT DOCUMENTS

| | | | |
|---|---|---|---|
| 3,230,524 | 1/1966 | Flowers et al. | 342/64 |
| 3,231,887 | 1/1966 | Cross et al. | 342/64 |
| 3,246,864 | 4/1966 | Mack et al. | 102/348 |
| 3,282,539 | 11/1966 | Wiant | 102/348 |
| 3,526,376 | 9/1970 | Cain | 244/138 R |
| 3,998,408 | 12/1976 | Caldwell, Jr. et al. | 244/138 R |
| 4,490,719 | 12/1984 | Botwin et al. | 342/64 |
| 4,495,580 | 1/1985 | Keearns | 342/64 |
| 4,514,733 | 4/1985 | Schmidllein et al. | 342/64 |
| 4,602,336 | 7/1986 | Brown | 342/64 |
| 4,993,662 | 2/1991 | Barnes et al. | 342/64 |
| 5,054,397 | 10/1991 | Hans et al. | 102/348 |
| 5,056,740 | 10/1991 | Roth et al. | 244/158 R |

Primary Examiner—Joseph F. Peters, Jr.
Assistant Examiner—VirnaLissi Ansley
Attorney, Agent, or Firm—Duft, Graziano & Forest

[57] ABSTRACT

The recoverable airborne instrument module is implemented using an aerodynamic housing which has at least one moveable control surface thereon. In operation, the recoverable instrument module is carried aloft by balloon to enable its instrument package payload to perform a series of meteorological measurements. The exterior housing of the recoverable instrument package has an aerodynamic shape, such as a delta wing airframe with a controllable rudder. A navigation circuit contained within the housing references the radio frequency transmissions of a plurality of beacons to determine the altitude and geographic position of the instrument package. This information, as well as data identifying the location of at least one predetermined landing site is used to dynamically calculate a flight path to controllably descend the instrument module to a selected one of these landing sites. The guidance control circuit uses the rudder to steer the recoverable instrument module in a glide along the computed flight path to perform a controlled descent to the selected predetermined landing site. A radio frequency transmitter broadcasts present position information to act as a beacon to expedite recovery of the instrument module.

32 Claims, 5 Drawing Sheets

SELF GUIDED RECOVERABLE AIRBORNE INSTRUMENT MODULE

FIELD OF THE INVENTION

This invention relates to instrument packages that are used to make measurements of atmospheric conditions and, in particular, to a recoverable airborne instrument module that both contains the instrument package and pilots itself to a predetermined landing site.

PROBLEM

It is a problem in the field of instrumentation to accurately make measurements of atmospheric conditions in a cost effective manner. There are numerous measurements of atmospheric conditions that are taken on a regular basis and these include air temperature, humidity, air pressure and wind velocity as the most common measurements. The systems used to take these measurements can be divided into two general classifications: fixed base operations, and airborne operations. In the airborne operations, an airplane passes over the site at which the measurements are to be taken and releases an instrument package, which is carried by parachute to the ground. This aircraft released instrument package is called a dropsonde. In the fixed base operations, the instrument package is carried aloft by a balloon from a fixed launch site, such as an airport. The balloon expands as the altitude increases and eventually bursts. Once the balloon bursts, the instrument package is released and a parachute is deployed to provide a controlled descent of the instrument package back to the ground. The problem with both of these operations is that the instrument package descends in an uncontrolled manner by parachute and is only infrequently recovered. Therefore, these instrument packages must be built to be disposable, which limits the cost of equipment that can be installed therein.

An example of this problem is that the need for rawinsondes in daily synoptic observations is as great today as it has ever been. However, high sonde costs threaten to reduce or eliminate the daily soundings taken at some sites in the worldwide sounding network. The high cost per sounding is due to the fact that the sondes are recovered in only approximately forty percent of the cases. There is therefore a critical need for a rawinsonde that delivers a higher level of performance than the sonde of today but at a lower cost per sounding. The quality of the measurements taken by the rawinsonde is limited by the fact that the primary criteria of the instrument is low unit cost. For example, wind data is collected by tracking the change in position of the sonde after it is released. The sonde position is computed using azimuth and distance measurements. As the balloon-borne sonde travels away from the launch site, the accuracy of the position data decreases. It is a typical practice to smooth the data received from these measurements on a 2 minute to 4 minute interval which results in a position accuracy of approximately 1 kilometer resolution. Therefore, it is evident that the present methodology of obtaining data on atmospheric conditions is of unsatisfactory accuracy and cost.

SOLUTION

The above described problems are solved and a technical advance achieved in the field by the recoverable airborne instrument module which accurately determines its present position and uses this data to guide its descent to a predetermined landing site. This is accomplished by installing the instrument package payload in the aerodynamic exterior housing of the recoverable instrument module which has at least one moveable control surface thereon. A navigation circuit contained within the aerodynamic housing determines the geographic location of the instrument package as well as the location of at least one predetermined landing site. The determined position data is used to dynamically calculate a flight path which allows the guidance control circuit to controllably descend the recoverable instrument module to a selected predetermined landing site.

In operation, the airborne recoverable instrument module is carried aloft by balloon in the traditional manner enabling the instrument package contained therein to perform its series of measurements of atmospheric conditions. Upon release from the navigation and balloon, the guidance control circuits are activated to self-guide the airborne recoverable instrument module to a landing. The exterior housing of the airborne instrument module has an aerodynamic shape, such as a delta wing airframe with a controllable rudder. The navigation circuit calculates the geographic position and altitude of the instrument package by referencing the radio frequency transmissions of a plurality of beacons. The calculated present location of the instrument package is then compared to data stored in a memory indicative of a number of predetermined landing sites in the vicinity of the launch site. The measured altitude and position are then used by the navigation circuit to dynamically calculate a flight path to a selected one of the predetermined landing sites. The guidance control circuit uses the rudder to steer the airborne recoverable instrument module, which glides in a controlled descent, toward the selected predetermined landing site. The airborne recoverable instrument module is landed at the landing site in a traditional glider mode, or a supplementary parachute can be deployed a short distance above the landing site in order to land the recoverable instrument module in a more vertical trajectory.

A small radio frequency transmitter is typically included in the instrument package in order to transmit collected data to a ground station. This radio frequency transmitter can also transmit the calculated location and altitude to the ground station prior to landing. A beacon is included in the recoverable instrument module in order to signal its location to a recovery team. The beacon can be periodically activated in order to save battery power and the radio frequency transmitter can function as the beacon. This self guided flight, along with the use of a beacon, enables a recovery team to locate the recoverable instrument module much more frequently than with present sonde designs. Therefore, the cost of the measurement instruments provided in the instrument package can be significantly increased while still maintaining the cost per sounding at a reasonable level since the primary cost would be that of the balloon and the lifting gas used to carry the instrument package aloft. In addition, the accurate determination of present position during the flight also significantly increases the accuracy of the wind measurements and enables the use of this apparatus in locales which are not equipped with tracking radar.

DETAILED DESCRIPTION

In a typical fixed site operation, such as an airport, the airport operators periodically release one or more balloons with an attached instrument package (commonly referred to as a rawinsonde), in order to measure temperature, humidity, air pressure and wind conditions at various altitudes around the fixed site. The measurements taken by the rawinsonde are transmitted by radio frequency to a receiver located at the fixed site. The exact position of the balloon and its instrument package is determined solely by the ambient wind conditions during the course of its flight. The balloon and its instrument package are typically propelled by the wind over the horizon or into areas which make recovery of the instrument package difficult. In the traditional rawinsonde application, once the balloon reaches a predetermined altitude and bursts, the rawinsonde is released from the balloon and a parachute is deployed in order to controllably return the rawinsonde to the ground. Again, the parachute can not control the position of the rawinsonde during the descent phase of the flight and the ambient winds further transport the rawinsonde in a manner that is beyond the control of the fixed site operators. Recovery of the rawinsonde once it reaches the earth is a function of the ability of the package to be spotted during its descent phase or to be located while on the ground. The typical recovery rate for such an operation is forty percent or less.

Recoverable Airborne Instrument Module Architecture

The recoverable airborne instrument module is implemented using an aerodynamic housing which has at least one moveable control surface thereon. A navigation circuit contained within the housing provides data indicative of the present altitude and geographic location of the instrument package. A memory in the instrument module stores data noting the location of at least one predetermined landing site in the vicinity of the launch site. The navigation circuit uses the calculated position data to dynamically calculate a flight path to enable the guidance control circuit to controllably descend the recoverable instrument module to a selected one of the predetermined landing sites.

In operation, the recoverable airborne instrument module with its payload of an instrument package is carried aloft by balloon to enable the instrument package to perform its series of measurements of atmospheric conditions. Upon release from the balloon, the navigation and guidance control circuits are activated to self-guide the airborne recoverable instrument module to a landing site. The exterior housing of the airborne instrument module has an aerodynamic shape, such as a delta wing airframe with a controllable rudder. The navigation circuit calculates the geographic position and altitude of the instrument package by referencing the radio frequency transmissions of a plurality of beacons. The calculated present location of the instrument package is then compared to data stored in a memory indicative of a number of predetermined landing sites in the vicinity of the launch site. The measured altitude and position are then used by the navigation circuit to dynamically calculate a flight path to a selected one of the predetermined landing sites. The guidance control circuit uses the rudder to steer the airborne recoverable instrument module which glides in a controlled descent, toward the selected predetermined landing site. The airborne recoverable instrument module is landed at the selected landing site in a traditional glider mode or a supplementary parachute can be deployed a short distance above the landing site in order to land the recoverable instrument module in a more vertical trajectory.

A small radio frequency transmitter is included in the instrument package in order to transmit collected data to a ground station. This radio frequency transmitter can also transmit the calculated location and altitude to the ground station prior to landing. A beacon is included in the recoverable instrument module in order to signal its location to a recovery team. The beacon can be periodically activated in order to save battery power and can be implemented as the radio frequency transmitter operated in a beacon mode. This self guided flight, along with the use of a beacon, enables a recovery team to locate the recoverable instrument module much more frequently than with present sonde designs. Therefore, the cost of the measurement instruments provided in the instrument package can be significantly increased while still maintaining the cost per sounding at a reasonable level since the primary cost would be that of the balloon and the lifting gas used to carry the instrument package aloft.

Exterior Architecture of Recoverable Airborne Instrument Module

Figure 1:
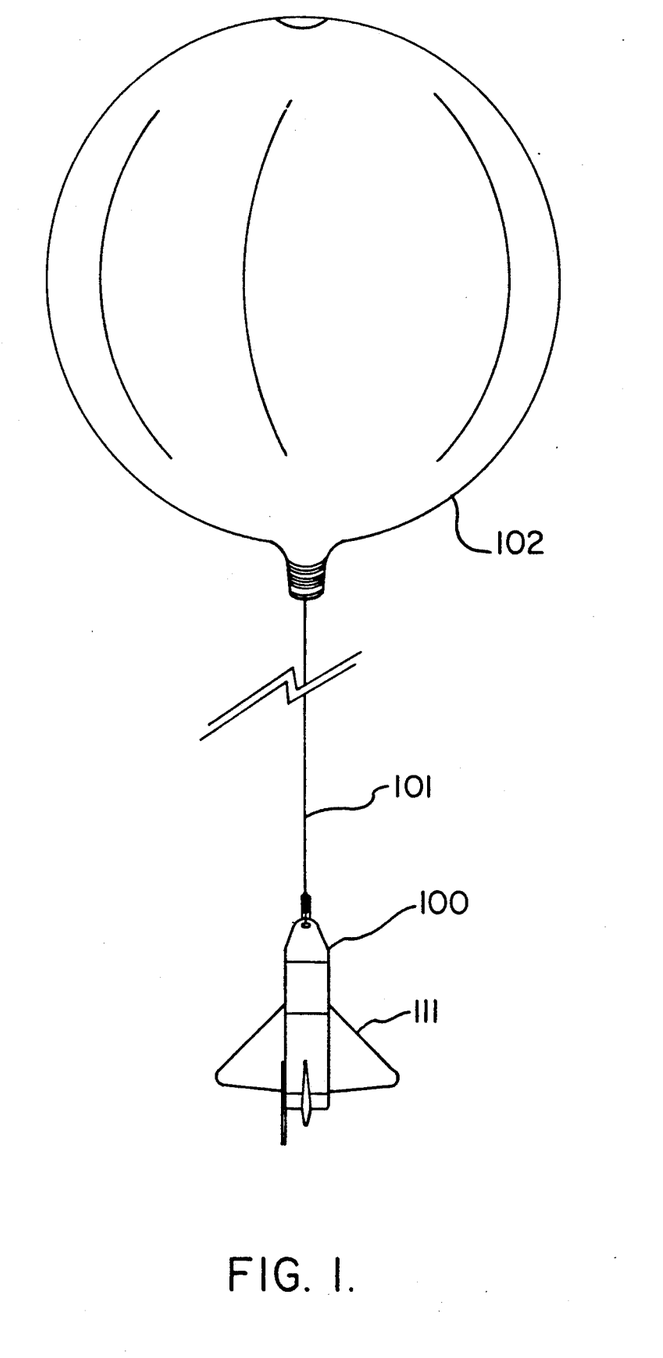
FIG. 1 illustrates a perspective view of the recoverable airborne instrument module and an associated balloon.

FIG. 1 illustrates a perspective view of the exterior housing of the recoverable airborne instrument module 100 which carries a payload consisting of an instrument package. The recoverable instrument module 100 and its instrument package payload is typically launched from a fixed site and is carried aloft by a balloon 102. This configuration can also be dropped from a moving aircraft. In FIG. 1, the recoverable airborne instrument module 100 is illustrated connected via a support cable 101 to a lifting package, such as a gas filled balloon 102. The design criteria for the recoverable airborne instrument module 100 include: (1) great inherent aerodynamic stability, (2) simplicity of control, (3) low mass and high frangibility (for safety reasons), and (4) modest cost. Typical design parameters for the recoverable airborne instrument module 100 are that this apparatus has a lift to drag ratio of at least three to one, which allows the recoverable instrument module 100 to glide at least three kilometers for every kilometer descent in altitude in still air. A forward velocity of at least twenty meters per second gives the vehicle good penetration, characteristics and minimize the destabilizing effects of turbulent air. There are a number of possible designs of the exterior housing of the recoverable airborne instrument module 100 and FIG. 1 illustrates a simple delta wing shape air frame which is selected because of its inherent stability and simplicity of construction.

The exterior housing 301 (FIGS. 3 and 4) of the recoverable airborne instrument module 100 consists of a lightweight material such as molded styrofoam which is configured in an aerodynamic shape which includes a delta wing 111 to provide lift for the package and at least one moveable control surface (a rudder 310) to provide steering capability for the package. This apparatus optionally includes a parachute housing 312 at the tail end thereof which stores a parachute (311) for the final stage of the descent. The flight control of the recoverable airborne instrument module 100 using this design requires only manipulation of the yaw axis for the adjustment of the heading of the recoverable airborne instrument module 100. This manipulation is accomplished by moving the rudder 310 in the tail using a small lightweight mechanical servo mechanism. The placement of the components of the instrument package payload within the exterior housing 301 determines the pitch necessary for a stable glide. The roll axis of the vehicle is inherently stable due to the delta wing design and the provision of generous amount of wing dihedral. Using this delta wing design, the wing span would be under fifty centimeters and the length of the exterior housing 301 is approximately the same length. The weight of the instrument package and exterior housing 301 would on the order of 400 to 500 grams.

Figure 3:
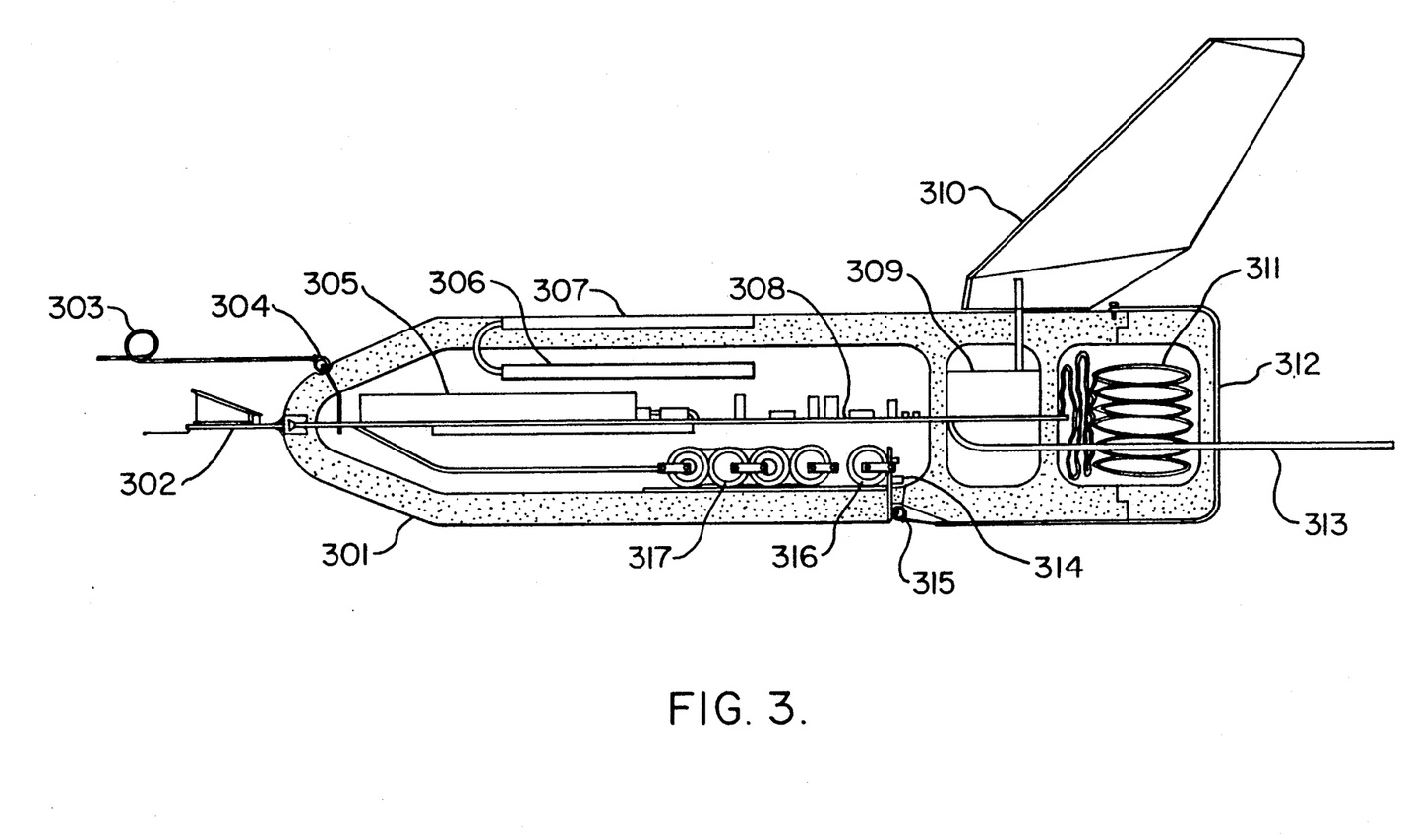
FIG. 3 illustrates a side view of the recoverable airborne instrument module.
Figure 4:
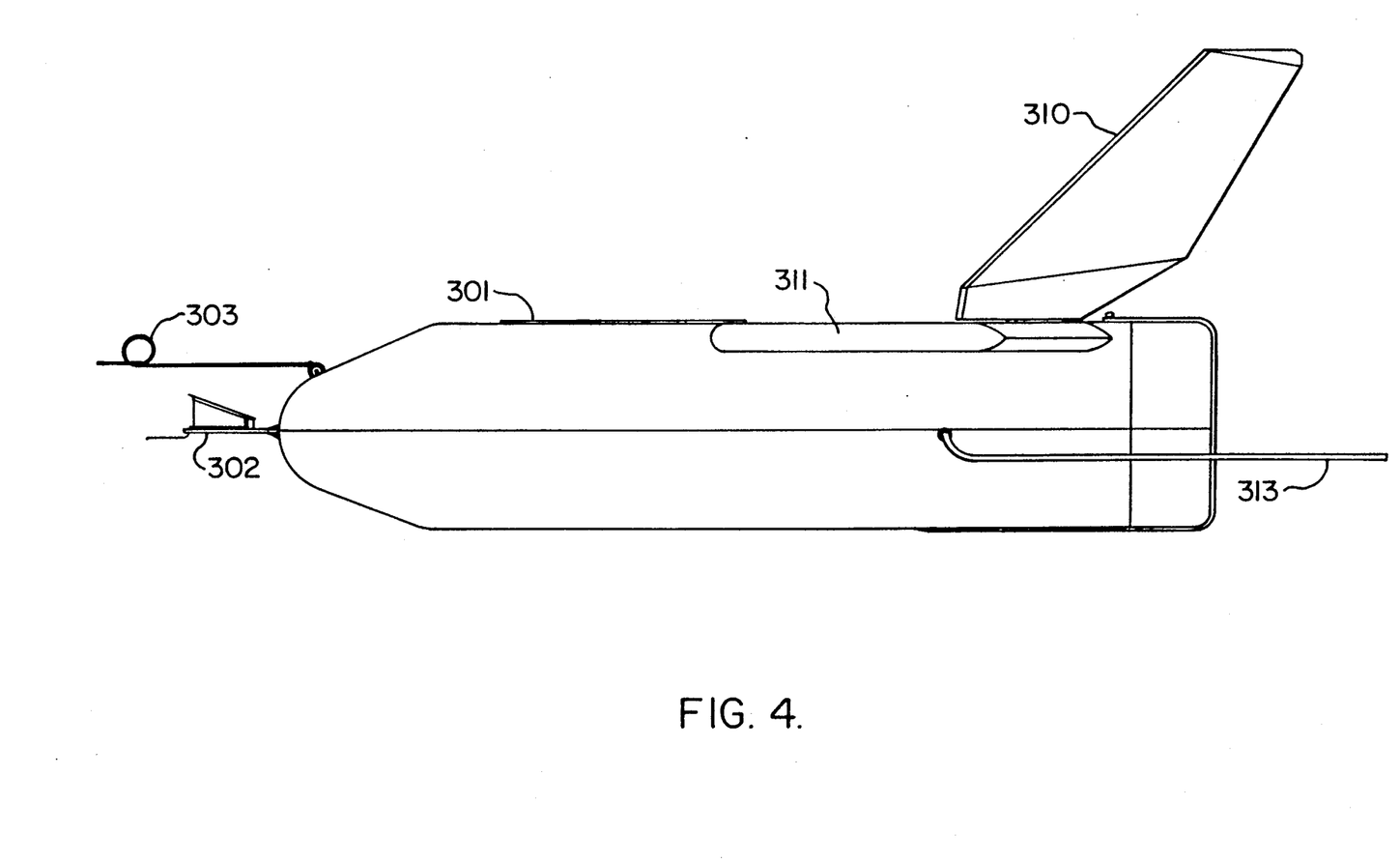
FIG. 4 illustrates additional details of the guidance control circuit.

Additional modular elements contained within exterior housing 301 are a plug-in meteorological sensor assembly 302 which provides the measurement data to the circuits contained in instrument module 305, explained in further detail below. The instrument module 305 is connected via telemetry electronics module 308 to telemetry antenna 313 which provides a radio frequency link with the launch site. GPS antenna 307 and navigator 306 provide altitude and position data. This circuitry is powered by batteries 317. The flight control instrumentation includes a rudder control servo 309 to control the position of rudder 310 as regulated by instrument module 305. A parachute release battery 316 powers a timer 314 which activates, at the completion of a predetermined duration flight, parachute release device 315. The parachute cover 312 is opened by the activation of parachute release device 315, causing parachute 311 to deploy. The connection of the instrument module to balloon is accomplished by connection loop 303 and disconnection is provided by cutdown device release mechanism 304.

Control and Guidance Circuits

Figure 2:
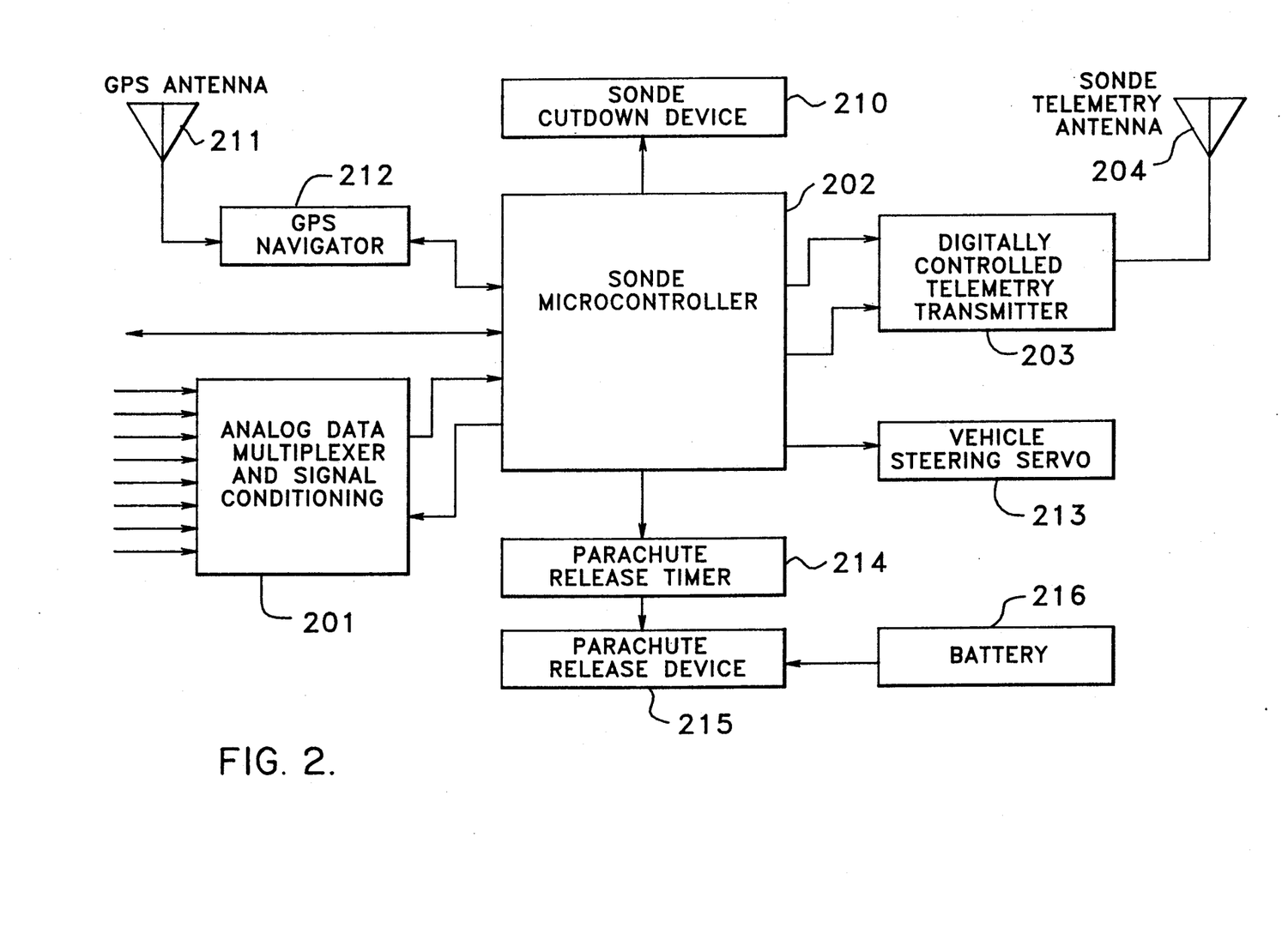
FIG. 2 illustrates in block diagram form the navigation and guidance control circuits of the recoverable airborne instrument module.

FIG. 2 illustrates in functional block diagram form the atmospheric measurement, navigation and guidance control circuits contained within the recoverable airborne instrument module 100. The circuits illustrated in FIG. 2 can be conceptually divided into two segments: data collection and flight control. The data collection circuits include a plurality of sensors (302) located in the instrument package, each of which produces a signal output, which signal is multiplexed and conditioned by the analog data multiplexer and signal conditioning circuit 201. The multiplexed data is transferred from the signal conditioning circuit 201 to the microcontroller 202 under the control of control signals forwarded to signal conditioning circuit 201 by the microcontroller 202. The data so retrieved is formatted by the microcontroller 202 and transmitted, along with control signals, to the telemetry transmitter 203 (module 308 on FIG. 3) which produces a radio frequency output that is applied to telemetry antenna 204 (element 313 on FIG. 3). Thus, the data that is continually collected by the sensors (302) in the instrument package are transmitted to a receiver located, for example, at the launch site to provide a continual flow of data indicative of the measurements of atmospheric conditions that are taken by the instrument package during its flight. These measurements can be for example air temperature, humidity, and air pressure.

The flight control circuits are shown in FIG. 2 as integrated with the instrument package circuits and sharing microcontroller 202 therewith. It is evident that these two sets of circuits can also be completely separate as flight vehicle and payload. For the purpose of simplicity, an integral version of these circuits is illustrated herein. The guidance control circuit includes a cutdown device 210 which is operated under control of the microcontroller 202 to release the recoverable airborne instrument module 100 from the balloon 102. Microcontroller 202 activates the release mechanism 304 contained within cutdown device 210 as a function of time of flight, or altitude reached in order to release the recoverable airborne instrument module 100 from balloon 102 once the data collection phase of the flight is completed.

Position Determining Circuits

The navigation circuit consists of GPS navigator 212, GPS antenna 211 and control software within microcontroller 202 which operate to determine the present altitude and geographic position of instrument module 100. An antenna 211 is provided for GPS navigator 212 in order to receive input signals from a plurality of transmitter beacons in order to obtain geographic location data to be used by microcontroller 202 to chart a flight path to a landing site. The GPS navigator 212 is a commercially available circuit that makes use of radio frequency data transmitted by a plurality of beacons, in order to calculate a precise geographic location. There are a number of beacon configurations that can be used for this position determining function. Satellites in geostationary orbit act as fixed site beacons as do ground based beacons such as LORAW-C or local beacons sited at the balloon release location. In the embodiment disclosed herein the GPS navigator 212 is a commercially available apparatus that makes use of the Navstar Global Positioning System (GPS) which presently consists of twenty-four satellites located in orbit at an altitude of 11,000 miles above the Earth in order to perform position calculations. At least two sets of radio frequency signals are received from these transmitter beacons by antenna 211 and relayed to navigator 212 in order to perform a traditional altitude and geographic position determination by means of triangulation. The beacon signals are very high frequency, low power microwave signals which are used by the navigator 212 to calculate the present position of the recoverable instrument module 100 to an accuracy of within 50 feet. The calculated position is forwarded by navigator circuit 212 to microcontroller 202 in order to identify with great precision the altitude and geographic location of the recoverable airborne instrument module 100. This altitude and position information can optionally be transmitted along with the collected sensor data via telemetry transmitter 203 in order to provide the fixed site operation with continuous data on the position of the recoverable airborne instrument module 100. The GPS navigator 212 is a three dimensional system, providing data on altitude and two dimensional geographic position. Other navigators which compute only two dimensional position can be supplemented by a pressure sensor which is coupled via signal conditioning circuit 201 to microcontroller 202 to provide altitude data.

Landing Site Selection

Once microcontroller 202 operates cutdown device 210 (at step 501 in FIG. 5) to release the recoverable airborne instrument module 100 from balloon 102, microcontroller 202 must calculate a flight path to a landing site in order to enable the fixed site operator to recover the recoverable airborne instrument module 100 and its instrument package payload. The flight path is calculated by microcontroller 202 using a flight path algorithm which makes use of the data stored in memory 217 indicative of the geographic position of at least one landing site in the vicinity of the launch site. Typically, a plurality of landing sites are programmed into memory 217 in order that microcontroller 202 can select one of these landing sites as a function of the ambient wind conditions and the course that the recoverable airborne instrument module 100 has taken during the balloon-borne portion of its ascent. At the time of release, microcontroller 202 compares the altitude and geographic position data output by navigator 212 with the landing site position data programmed into memory 217 in order to identify a landing site in close proximity to the present location of the recoverable airborne instrument module 100.

Flight Path Control

Figure 5:
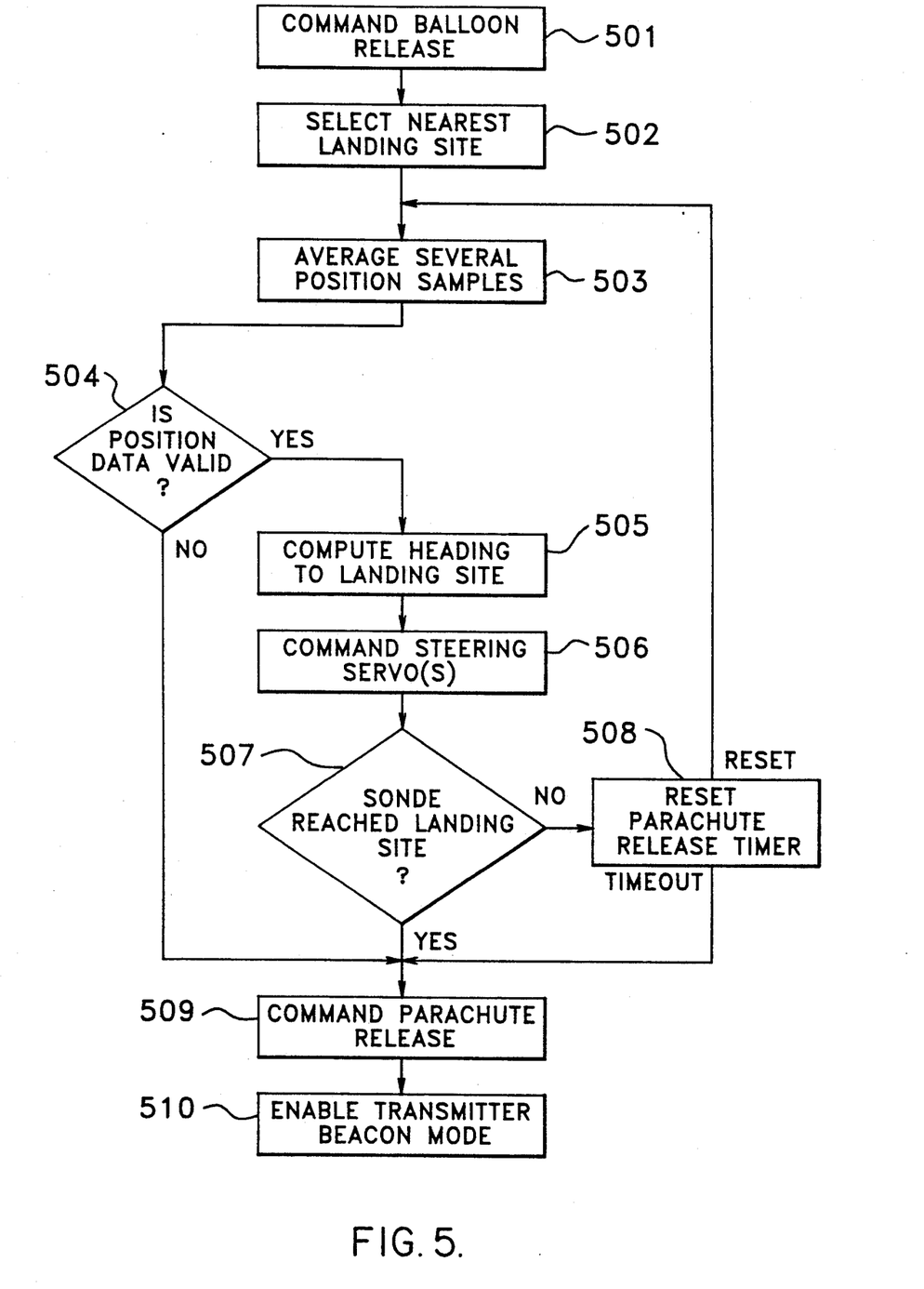
FIG. 5 illustrates in flow diagram form the operational steps taken by the navigation and guidance control circuits to guide the recoverable airborne instrument module to the recovery site.

Once a landing site has been selected at step 502 by microcontroller 202, the data regarding the geographic location and altitude above sea level is loaded into microcontroller 202 and compared with several samples of the altitude and position data from navigator 212 at step 503. At step 504, the validity of the position data is determined and, if not valid, guided flight is aborted and the the parachute 311 is deployed at step 309. The telemetry transmitter 203 is activated at step 510 to enable recovery of the instrument module 100. If the position data is determined to be valid at step 504, the position differential and altitude differential is used by microcontroller 202 to calculate at step 505 the flight path for the recoverable airborne instrument module 100 to reach the selected landing site. As noted above, the delta wing design of the exterior housing requires activation of the rudder 112 in order to provide steering control. This single control surface is moved by use of vehicle steering servo 213 which is a conventional servo mechanism mechanically coupled to the rudder 112. Microcontroller 202 transmits control signals at step 506 to vehicle steering servo 213 in order to guide the recoverable airborne instrument module 100 to the selected landing site. As the recoverable airborne instrument module 100 traverses this flight path, navigator 212 continually provides altitude and geographic position data to microcontroller 202 which dynamically regulates the flight path by comparing present location against the position of the selected landing site as programmed into memory 217.

Microcontroller 202 dynamically recomputes the flight path via steps 503 - 507 based on the continual position data input by navigator 212 until the recoverable airborne instrument module 100 reaches a predetermined altitude above the selected landing site at step 507 or at step 508 it is determined that an excessive amount of flight time has elapsed. The recoverable airborne instrument module 100 can be landed at the landing site in glider fashion or the final stage of the descent can be accomplished by way of a parachute. In the case of the parachute descent, controller 202 monitors altitude data received from analog data multiplexor and signal conditioning circuit 201 with data indicative of a predetermined altitude above the landing site in order to determine at which point the parachute should be deployed. Once this predetermined altitude is reached, microcontroller 202 activates parachute release device 215 at step 509 in order to deploy the parachute 311 in well known fashion from its location at the rear end of the recoverable airborne instrument module 100. Alternatively, a release timer 214 can be used to activate the parachute a predetermined time after the descent of the recoverable airborne instrument module 100 has begun. The parachute release timer 214 is activated by microcontroller 202 at the same time that the cutdown device 210 is activated. In either case, the parachute is deployed when the recoverable airborne instrument module 100 is over or at least within the vicinity of the selected landing site.

Instrument Module Recovery

During the entirety of the descent phase, the altitude and position of the recoverable airborne instrument module 100 is calculated by navigator 212 and transmitted by telemetry transmitter 203 to a receiver at the launch site or in a recovery vehicle which is tracking the course of the recoverable airborne instrument module 100. Once the recoverable airborne instrument module 100 has landed, the data produced by navigator 212 reaches a fixed value and microcontroller 202 can optionally deactivate all of the circuitry within the instrument package and all the guidance control circuitry in order to conserve power. Microcontroller 202 can periodically activate telemetry transmitter 203 to transmit position information to the recovery team in order to aid in the location of the recoverable airborne instrument module 100. Microcontroller 202 can periodically activate the transmitter in a manner that conserves battery power and enables operation in the beacon mode over the period of a number of days. This beacon mode increases the probability of recovery and makes use of the existing circuitry within the guidance control system for this purpose.

While a specific embodiment of this invention has been disclosed, it is expected that those skilled in the art can and will design alternate embodiments of this invention that fall within the scope of the appended claims.

I claim:

1. An unpropelled airborne module that returns to one of a plurality of ground level landing sites by gliding in a self-guided manner comprising:
   an aerodynamically shaped winged exterior housing including:
   at least one moveable control surface to steer said airborne module;
   means for determining a geographic position of said airborne module;
   means for storing, for the duration of said gliding, programmed data indicative of the geographic position of at least one of said plurality of ground level landing sites;

means, responsive to said storing of said programmed data and said determining of said geographic position of said airborne module, for computing a flight path for said airborne module to said at least one of said plurality of ground level landing sites in response to said determining of said geographic position of said airborne module; and means, responsive to said computing of said flight path, for operating said moveable control surface to guide said airborne module along said flight path.

2. The airborne module of claim 1 further comprising:
means for measuring altitude of said airborne module; and
wherein said computing means is additionally responsive to said measured altitude to compute said flight path.

3. The airborne module of claim 1 further comprising:
means for broadcasting data, via wireless communication, indicative of said determined geographic position of said airborne module.

4. The airborne module of claim 3 further comprising:
means for periodically activating said broadcasting means when said airborne module has reached said landing site.

5. The airborne module of claim 1 further comprising:
a parachute, deployable to slow the descent of said airborne module to said landing site.

6. The airborne module of claim 5 further comprising:
means for measuring altitude of said airborne module; and
means for deploying said parachute when said measured altitude is less than a predetermined value.

7. The airborne module of claim 1 wherein said exterior housing is a delta-wing shape having a moveable control surface comprising a rudder.

8. The airborne module of claim 1 wherein said determining means includes:
means for monitoring a plurality of beacon signals generated external to said airborne module and broadcast to said airborne module; and
means, responsive to said monitored beacon signals, for computing data indicative of the geographic position of said airborne module.

9. The airborne module of claim 8 wherein said beacon signals comprise signals broadcast from a plurality of satellites.

10. The airborne module of claim 8 wherein said computing means dynamically computes said flight path on a continuing basis in response to said geographic position of said airborne module determined by said determining means, based on said monitored beacon signals.

11. The airborne module of claim 1 wherein said computing means dynamically computes said flight path on a continuing basis in response to said geographic position of said airborne module determined by said determining means.

12. A method of guiding an unpropelled airborne module that returns to one of a plurality of ground level landing sites by gliding in a self-guided manner, wherein said airborne module includes an aerodynamically shaped winged exterior housing and has at least one moveable control surface to steer said airborne module comprising the steps of:
determining a geographic position of said airborne module;
storing, for the duration of said gliding, programmed data indicative of the geographic position of said plurality of ground level landing sites;
retrieving, in response to said determining of said geographic position of said airborne module, a portion of said stored data indicative of the geographic position of one of said plurality of ground level landing sites;
computing, in response to said retrieving of said programmed data and said determining of said geographic position of said airborne module, a flight path for said airborne module to said one of said plurality of ground level landing sites; and
operating, based on said computed flight path, said moveable control surface to guide said airborne module along said flight path.

13. The method of claim 12 further comprising the step of:
measuring altitude of said airborne module to compute said flight path.

14. The method of claim 12 further comprising the step of:
broadcasting data, via wireless communication, indicative of said determined geographic position of said airborne module.

15. The method of claim 14 further comprising the step of:
periodically activating said step of broadcasting once said airborne module reaches said landing site.

16. The method of claim 12 wherein said airborne module includes a parachute, deployable to slow the descent of said airborne module to said landing site, further comprising the steps of:
measuring altitude of said airborne module; and
deploying said parachute when said measured altitude is less than a predetermined value.

17. The method of claim 12 wherein said step of determining includes:
monitoring a plurality of beacon signals generated external to said airborne module and broadcast to said airborne module; and
computing, in response to said monitored beacon signals, data indicative of the geographic position of said airborne module.

18. An unpropelled airborne module that returns to one of a plurality of predetermined ground level landing sites by gliding in a self-guided manner comprising:
an aerodynamically shaped exterior housing including:
at least one moveable control surface to steer said airborne module;
means for determining a geographic position of said airborne module, including:
means for monitoring a plurality of beacon signals generated external to said airborne module and broadcast to said airborne module,
means, responsive to said monitoring of said beacon signals, for computing data indicative of said geographic position of said airborne module;
means for storing, for the duration of said gliding, preprogrammed data indicative of the geographic position of said plurality of predetermined ground level landing sites;
means, responsive to said storing of said data and said determining of said geographic position of said airborne module, for selecting one of said plurality of said predetermined ground level landing sites as a destination landing site;

means for computing a flight path for said airborne module from said geographic position determined by said determining means to said destination landing site; and means, responsive to said computing of said flight path, for operating said moveable control surface to guide said airborne module along said flight path.

19. The airborne module of claim 18 further comprising:

means for measuring altitude of said airborne module; and wherein said computing means is additionally responsive to said measured altitude to compute said flight path.

20. The airborne module of claim 18 further comprising:

means for broadcasting data, via wireless communication, indicative of said determined geographic position of said airborne module.

21. The airborne module of claim 20 further comprising:

means for periodically activating said broadcasting means when said airborne module has reached said destination landing site.

22. The airborne module of claim 18 further comprising:

a parachute, deployable to slow the descent of said airborne module to said destination landing site.

23. The airborne module of claim 22 further comprising:

means for measuring altitude of said airborne module; and means for deploying said parachute when said measured altitude is less than a predetermined value.

24. The airborne module of claim 18 wherein said exterior housing is a delta-wing shaped having a moveable control surface comprising a rudder.

25. The airborne module of claim 24 wherein said beacon signals comprise signals broadcast from a plurality of satellites.

26. The airborne module of claim 24 wherein said computing means dynamically computes said flight path on a continuing basis in response to said geographic position of said airborne module determined by said determining means, based on said monitored beacon signals.

27. The airborne module of claim 18 wherein said computing means dynamically computes said flight path on a continuing basis in response to said geographic position of said airborne module determined by said determining means.

28. A method of guiding an unpropelled airborne module that returns to one of a plurality of ground level landing sites by gliding in a self-guided manner, wherein said airborne module includes an aerodynamically shaped winged exterior housing that has at least one moveable control surface to steer said airborne module comprising the steps of:

determining a geographic position of said airborne module, including:

a monitoring a plurality of beacon signals generated external to said airborne module and broadcast to said airborne module, computing, in response to said monitoring of said beacon signals, data indicative of the geographic position of said airborne module;

storing, for the duration of said gliding, preprogrammed data indicative of the geographic position of said plurality of ground level landing sites;

retrieving, in response to said computing of said data indicative of a determined said geographic position of said airborne module, a portion of said stored data indicative of the geographic position of a selected one of said plurality of ground level landing sites;

computing, in response to said retrieving of said data indicative of said geographic position of said selected one of said plurality of ground level landing sites and said determined geographic position of said airborne module, a flight path for said airborne module from said determined geographic position of said airborne module to said selected one of said plurality of said landing sites; and operating, based on said computed flight path, said moveable control surface to guide said airborne module along said flight path.

29. The method of claim 28 further comprising the step of:

measuring altitude of said airborne module to compute said flight path.

30. The method of claim 28 further comprising the step of:

broadcasting data, via wireless communication, indicative of said determined geographic position of said airborne module.

31. The method of claim 30 further comprising the step of:

periodically activating said step of broadcasting once said airborne module reaches said landing site.

32. The method of claim 28 wherein said airborne module includes a parachute, deployable to slow the descent of said airborne module to said landing site, further comprising the steps of:

measuring altitude of said airborne module; and deploying said parachute when said measured altitude is less than a predetermined value.

* * * * *